Aug. 3, 1937. G. A. MITCHELL 2,088,715
SHUTTER DISSOLVE MECHANISM
Original Filed May 7, 1934   6 Sheets-Sheet 3

Fig 3

Inventor
George A. Mitchell.
Attorney.

Aug. 3, 1937.  G. A. MITCHELL  2,088,715
SHUTTER DISSOLVE MECHANISM
Original Filed May 7, 1934   6 Sheets-Sheet 5

Inventor
George A. Mitchell

Attorney.

Patented Aug. 3, 1937

2,088,715

UNITED STATES PATENT OFFICE 2,088,715

SHUTTER DISSOLVE MECHANISM

George A. Mitchell, Los Angeles, Calif., assignor to Mitchell Camera Corporation, West Hollywood, Calif., a corporation of Delaware Original application May 7, 1934, Serial No. 724,351. Divided and this application December 7, 1935, Serial No. 53,380

13 Claims. (Cl. 88—17)

This invention relates generally to motion picture cameras, and more particularly to shutter dissolve mechanisms for motion picture cameras.

The present invention is concerned with the provision of dissolve mechanism control devices in such a camera as is described in my copending application entitled "Sound insulated motion picture camera", filed May 7, 1934, Ser. No. 724,351, in which the invention claimed in the present application is also disclosed, and in which are found claims covering certain aspects of the subject matter shown in the present case. The present application is a division of said application Ser. No. 724,351. It is a characteristic of this type of camera that its film mechanism, including drive motor, dissolve mechanism, film magazine and a focusing instrument, shifts laterally behind the photographic lens between a position for focusing and a position for photographing the scene. This shiftable mechanism is completely enclosed by a sound insulated exterior case.

It is an object of the present invention to provide control devices for the shifting shutter dissolve mechanism operable from the exterior of the sound insulated case.

In accordance with the present invention, the various operating devices for the dissolve mechanism are mounted in an exterior wall of the sound insulated case, and are cooperable with the dissolve mechanism when the interior film mechanism is shifted to "taking" position. These operating devices are automatically retracted when the dissolve mechanism is not in use, clearing the film mechanism and permitting it to be shifted to focusing positions without interference by said devices.

The invention will be better understood from the following detailed description of a present preferred embodiment thereof, reference for this purpose being had to the accompanying drawings, in which.

The present invention is here shown in a specific form applied to a specific dissolve mechanism which is incorporated in a particular type of camera; it will be understood, however, that this is for illustrative purposes only, and that the invention in its broader aspects is not to be limited to the particular illustrative forms of the invention here detailed.

In the drawings, numeral 10 designates generally the exterior case of the camera, this case comprising a box-like casting 11 including front and rear walls 12 and 13, respectively, side wall 14 having downwardly swinging door 15, side wall 16, top 17 and bottom or bed plate 18. This bed plate is adapted to be secured down to the head plate 20 of the tripod.

The top wall 17 of case 11 has a rectangular opening 21 through which extends the lower portion or throat of the usual camera magazine 22. A magazine compartment 23 is removably mounted on the top of case 11 around opening 21, and is of a size and shape to accommodate the camera magazine in the two different positions of the laterally shiftable camera box 32 that carries it.

The entire case and magazine compartment is shown to be lined with a layer 26 of suitable sound insulation material.

The operative motion picture camera mechanism, or camera proper, is mounted within this sound insulated case. This interior mechanism will be seen to embody a horizontal base or bed plate 30, having rising from its forward end a vertical, hollow head portion 31, and a camera box or mechanism carrier 32 located to the rear of head 31 and arranged to slide transversely across bed 30 in ways 33.

Figure 3:
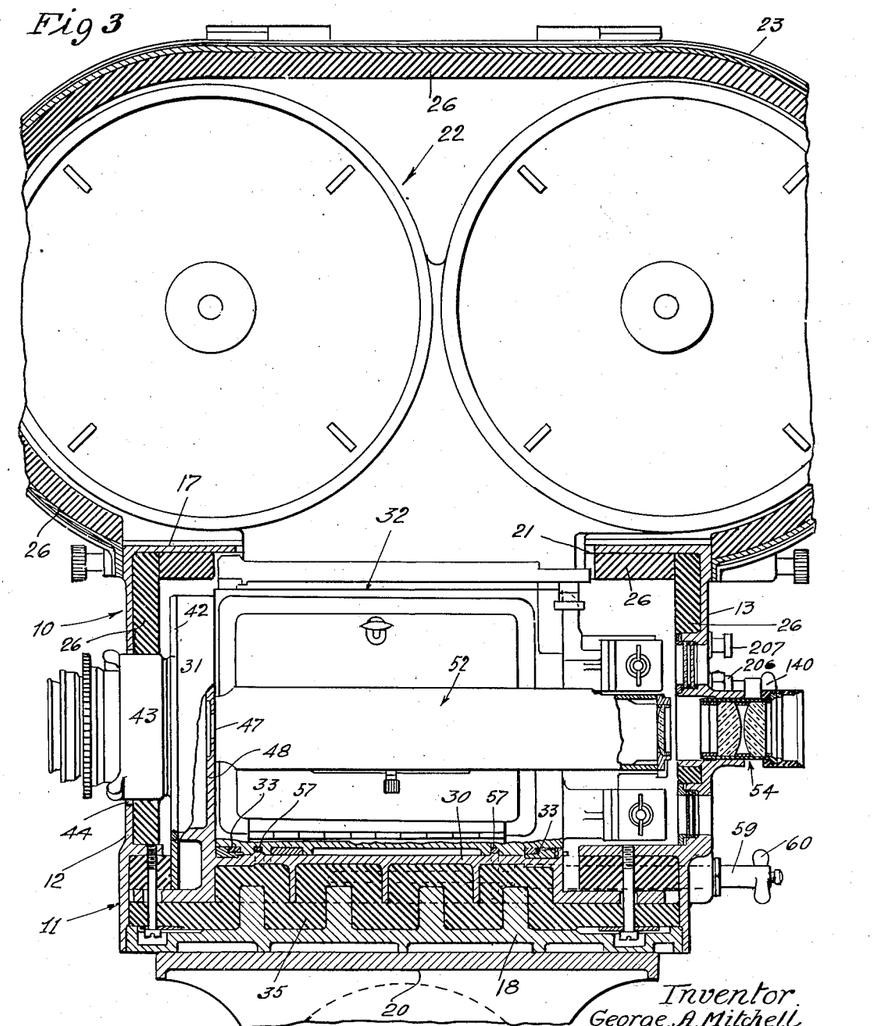
Fig. 3 is a section taken on line 3—3 of Fig. 2, with parts of the camera broken away to show underlying parts in section.

Camera base 30 is supported on an insulation pad 35, which rests on exterior housing bed plate 18, and is secured in place within the exterior housing in any suitable manner; for instance, in the manner clearly shown in Fig. 3.

The hollow camera head 31 that rises from the forward end of base member 30 is closed at its forward side by a plate 42 that carries the lens mount 43, the lens mount projecting forwardly through a circular opening 44 in front casing wall 12. This lens mount carries the usual photographic lens, not shown. Immediately to the rear of the photographic lens and in alinement therewith there is formed in head 31 the usual photographic aperture, indicated at 47, this aperture extending through the rear wall 48 of the hollow head 31.

The camera box 32 carries on its top the usual film magazine 22, as previously mentioned, and box 32 carries the usual film guide rollers, sprockets, and intermittent film movement mechanism, for intermittently moving the film downwardly within box 32 past aperture 47, in the focal plane of the photographic lens, these parts all being well known and requiring no present illustration.

Figure 4:
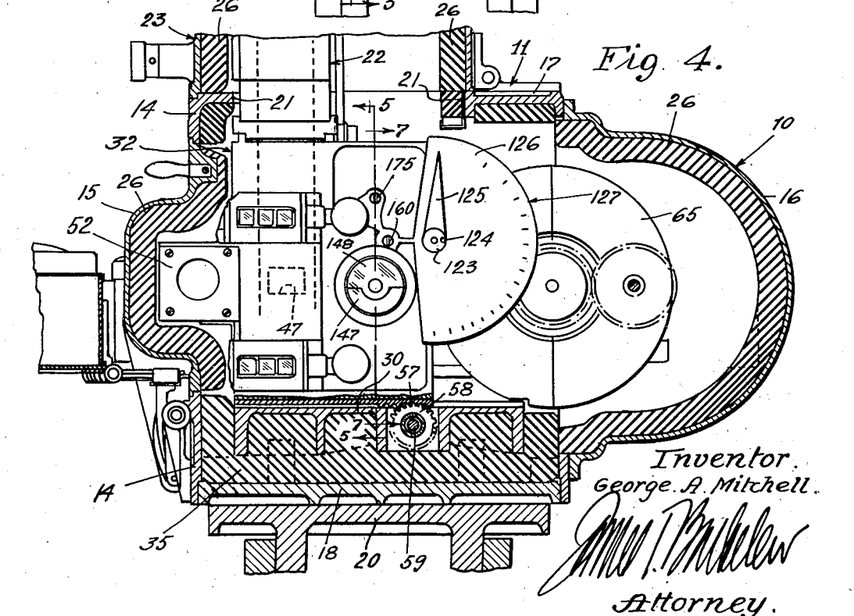
Fig. 4 is a section taken on line 4—4 of Fig. 1.
Figures 12, 13, 14:
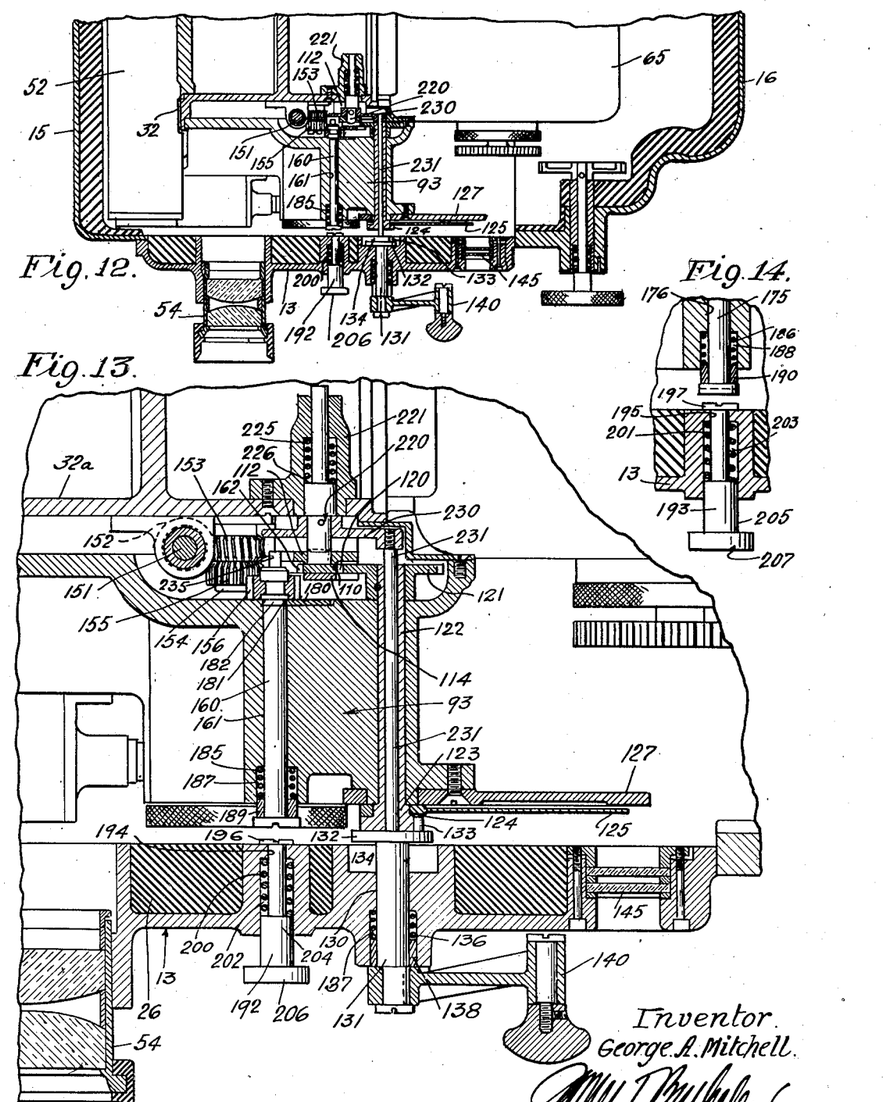
Fig. 12 is a section taken on line 12—12 of Fig. 2.
Fig. 13 is an enlarged detail taken from Fig. 12, but showing the parts in a different position.
Fig. 14 is a section taken on line 14—14 of Fig. 2.

Mounted on the side of camera box 32 at the level of photographic aperture 47 is a focusing tube 52. The forward end of this focusing tube comes closely adjacent the rear surface of camera head 31 when camera box 32 is moved to the right on bed 30 (viewing the camera from the rear), and by such movement the forward end of the focusing tube is brought into register with the photographic aperture 47 in head 31 and thus into alinement with the photographic lens. In this position the focusing tube alines with an eye piece 54 which is permanently mounted in the rear wall 13 of the exterior camera case, this eye piece being mounted in permanent optical alinement with aperture 47 and the photographic lens. The other camera box position, indicated in Figs. 4 and 12, is the "take" position, with the film within the camera box alined with aperture 47 and the photographic lens, and the focusing tube 52 moved out of alinement therewith. When the camera box is moved from the illustrated "take" position to a position with the focusing tube alined with aperture 47 and with its eye-piece 54, then the image normally formed on the film may be viewed through eye piece 54 and the focusing tube, and at this time the photographic lens may be accurately focused. The camera box is then shifted back to the position of Figs. 4 and 12 for "taking", and the image is sharp on the film.

For the purpose of so shifting the camera box between the taking and focusing positions described, the underside of said box is provided with a pair of racks 57 (Figs. 3 and 4), with which mesh spur gear 58 on a shaft 59 that extends outwardly through the rear wall 13 of the exterior housing, and has on its outer end an operating handle 60. Rotation of this handle 60 causes gears 58 to act through racks 57 to shift the camera box from one position to the other.

Figure 1:
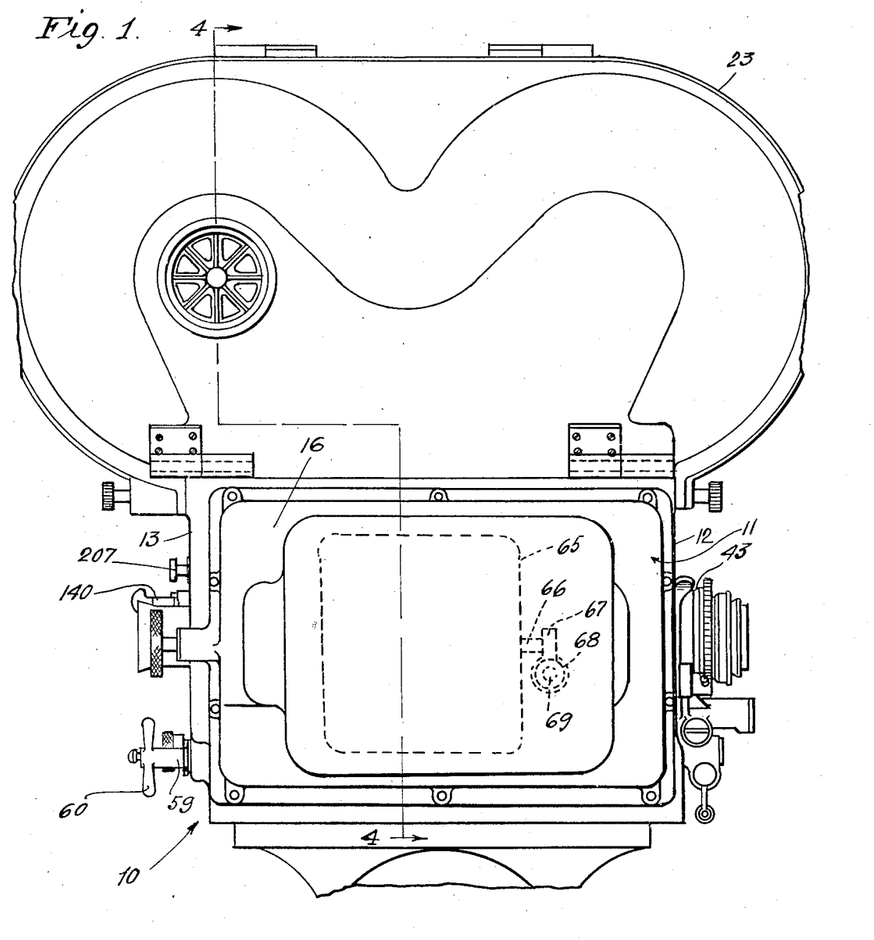
Fig. 1 is a side elevation of a motion picture camera equipped with the present invention.
Figure 5:
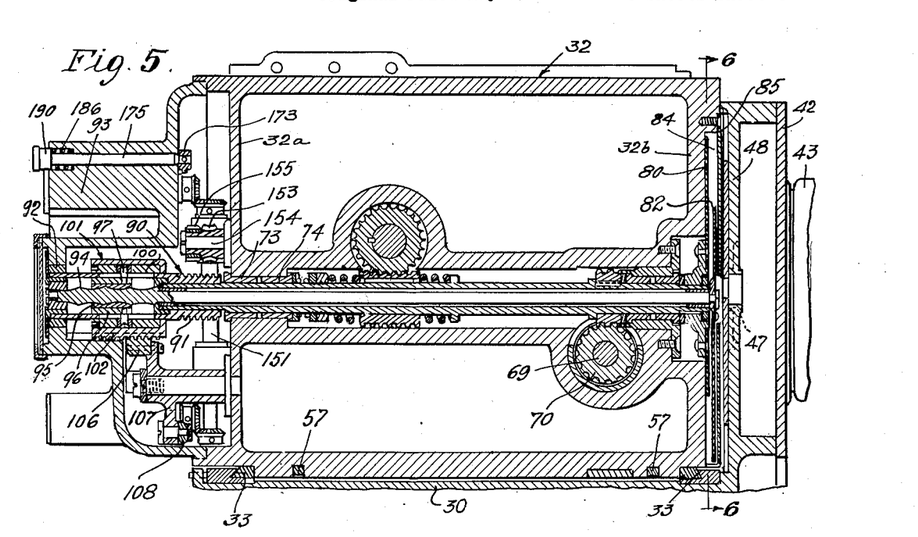
Fig. 5 is a section taken on line 5—5 of Fig. 4.

The camera motor is designated at 65, its housing being affixed to the side of camera box 32 (Figs. 4 and 12), so that the camera motor shifts with the transverse movement of the camera box. The motor shaft 66 has on its forward end a spiral gear 67 (Fig. 1) meshing with a spiral gear 68 on a transverse shaft 69 that drives the usual intermittent film mechanism (not shown). Shaft 69 also drives the shutter mechanism and has for this purpose a spiral gear 70 (Fig. 5) meshing with a spiral gear 71 which is mounted fast on the forward end of hollow shutter shaft 72. Shaft 72 is shown in Fig. 5 to be journaled in suitable bearings 73, 74, supported by camera box 32. On the extreme forward end of hollow shaft 72 is the usual shutter 80. Mounted to rotate within hollow shaft 72 is an inner shaft 81, and mounted on the forward end thereof is a shutter leaf 82. These shutter members 80 and 82 rotate within an annular recess 84 sunk in the front face of camera box forward wall 32b, this recess being enclosed by a cover plate 85 which has an aperture 86 registering with photographic apertures 47 of camera head 31.

Figure 6:
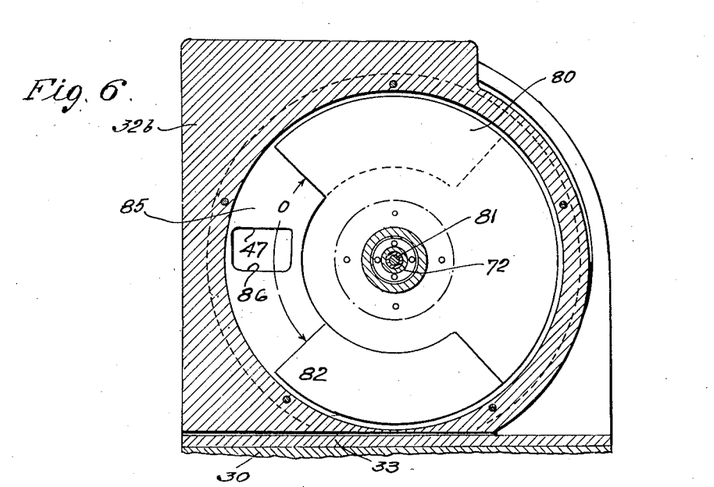
Fig. 6 is a section taken on line 6—6 of Fig. 5.

Shutter members 80 and 82, which are of conventional form, will be understood to be mounted to rotate between the photographic aperture and the film within camera box 32. These shutter members are adapted to take such a relative position as to provide substantially a 170° angular opening therebetween, so as to uncover the film for substantially 170° of rotation when shutter shafts 72 and 81 are rotated as one; or, by relative adjustive rotation of said shafts, to reduce the angular opening between the shutter members down to zero, or in other words to effect what is known as a dissolve. In Fig. 6 the shutter members are shown during the course of such a dissolve, the shutter opening 0 being reduced to approximately 90°.

Fastened on hollow shutter shaft 72, immediately to the rear of camera box rearward wall 32a, is a gear sleeve 90 (Figs. 5 and 7), the forward end of which is formed as a worm 91, and the rearward end of which is journaled in a bearing 92 carried by mounting casting 93 secured to camera box 32. The rearward end of inner shutter shaft 81 has a screw section 94, and mounted to work thereon is a nut member 95. This nut member 95 is fast within a sleeve 96 which slidably fits the bore of gear sleeve 90, and carries studs 97 which project outwardly through longitudinal slots 98 in sleeve 90. The outer ends of studs 97 engage in apertures 99 in a sleeve 100 which is slidably mounted on sleeve 90. This sleeve 100 is embraced at its ends by and is rotatable within a cylindric carrier 101, the lower side of which has a downwardly projecting gear portion or rack 102. This carrier member 101 is constrained against rotation by a way 104 formed in member 93 (Fig. 8) which receives and guides said gear projection 102 for longitudinal movement. Gear portion 102 is formed with spiral gear teeth and the latter mesh with a spiral gear segment 106. Fast with this gear segment is a depending arm 107, to the lower end of which is pivoted one end of a link 108, the other end of which is pivoted to a vertically movable rack 110 (Figs. 7, 8, 10, 11, 12 and 13).

This rack 110 moves vertically in a vertical guide groove or way 111 formed in the outer surface of a vertical supporting member 112 which is mounted on camera wall 32a, the rack being confined in said way by means of a plate 114 mounted on the outer surface of member 112 (Figs. 7, 8, 10, and 11). The lower portion of cover plate 114 is formed with a longitudinal slot 115 which receives the pivot connection between link 108 and rack 110.

This rack 110 has on one edge rack teeth 120 which are constantly in mesh with a spur gear 121, which gear is fast on a rearwardly extending hollow shaft 122 journaled in said mounting casting 93. The rearward end of shaft 122 has an integrally formed head 123, having in its rearward surface an off center aperture 124 (Figs. 12 and 13). Head 123 carries a pointer 125 which is adapted to move through substantially 170° of arc over a calibrated shutter-opening scale 126 inscribed on a plate 127 carried by mounting member 93. Journaled in and longitudinally slidable through a bore 130 in rear housing wall 13 is a shaft 131, the inner end of which carries a crank disk 132 having a crank pin 133, said crank disk and pin being adapted to be received within a countersink 134 formed in the inner surface of wall 13 (Fig. 12). Shaft 131 normally carries crank disk 132 and pin 133 in the latter position by reason of a coil spring 136 placed around said shaft in a counterbore 137, which spring acts outwardly against a collar 138 on shaft 131. The exterior end of shaft 131 carries a manual operating crank 140.

Figure 2:
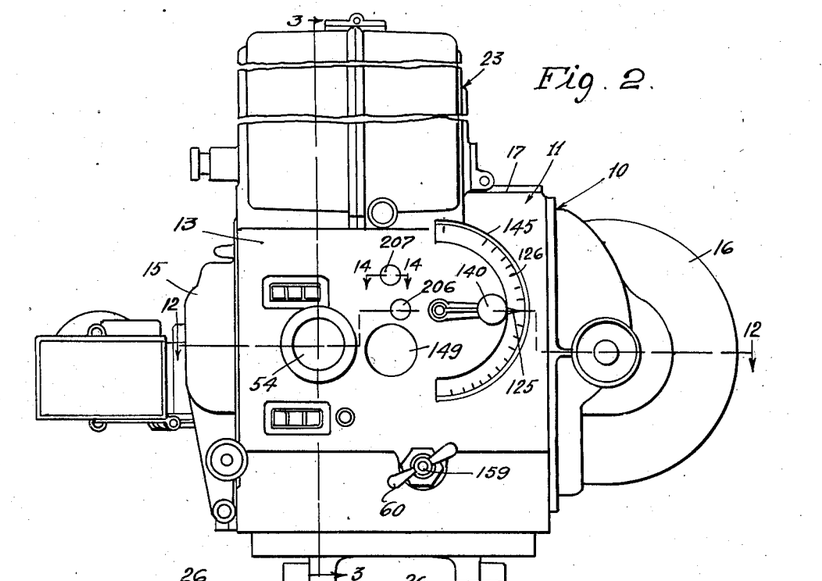
Fig. 2 is a rear view of the camera shown in Fig. 1.
Figure 7:
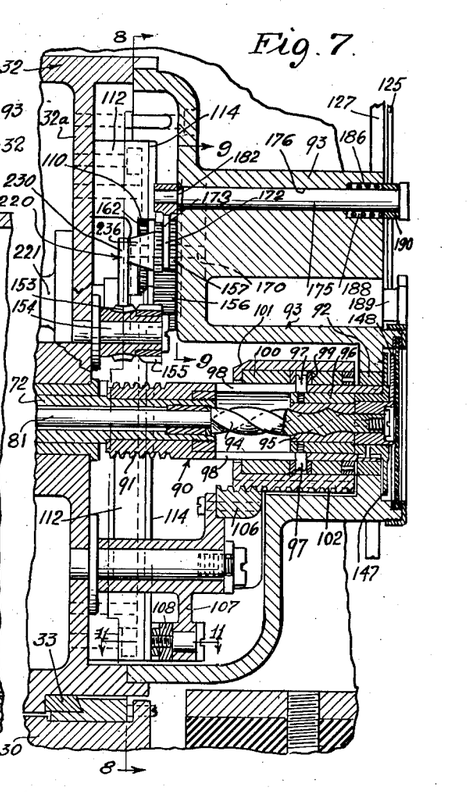
Fig. 7 is a section taken on line 7—7 of Fig. 4.

Shaft 131 is so located in camera housing wall 13 as to be concentric with shaft 122 when the camera box 32 has been moved to the "take" position indicated in Figs. 12 and 13. Crank pin 133 on shaft 131 is so arranged that at a time when the camera box is in the position of Fig. 12, it may be drivingly engaged with aperture 124 by forcing crank 140 and shaft 131 inwardly against the force of spring 136 and turning the crank until the pins find the aperture. This engagement having been made, turning of crank 140 causes rotation of shaft 122 and gear 121, thereby moving rack 110 up or down, depending upon the direction in which the crank is turned. Such movement of rack 110 acts through link 108 and arm 107 to rotate spiral gear segment 106, which in turn acts on spiral gear element 102 to cause longitudinal translation of carrier member 101. The rotating sleeve 100 embraced and carried by member 101 is thus caused to move longitudinally on gear sleeve 90, and in so doing acts through stud 97 to move nut member 95 forwardly or rearwardly within the bore of the gear sleeve. Since the nut member is constrained against relative rotation within the gear sleeve, this longitudinal movement of the nut member causes rotation of the screw element 94 relative to gear sleeve 90, and consequently relative rotation of shaft 91 within hollow shaft 72. Thus by this operation the opening between the shutter members carried by the shutter shafts 72 and 81 may be varied between zero and 170°, and this control may obviously be effected when the camera is in full operation. The scale 124 which indicates the degrees of shutter opening is visible from outside the camera through an arcuate glass window 145 in wall 13, with which the scale comes into register when the camera box is in the position of Fig. 12. Preferably, the rear end of inner shutter shaft 81 and the rear end of gear sleeve 90 on hollow shutter shaft 72 are provided with shutter signal devices 147 and 148, respectively, (Figs. 4 and 7). Member 147 is a circular disc, one half of which is painted black to correspond with the shutter opening of the shutter on the forward end of shaft 72, while member 148, which may be painted black all over, is of the same shape as the shutter leaf on the forward end of shutter shaft 81. These shutter signal members register with a double glass walled window 149 in rear camera wall 13 (Fig. 2) when the camera mechanism is in the "take" position described, and indicate at a glance the positions of the two shutter members.

Thus when camera box 32 has been moved by operation of handle 60 to "take" position, the dissolve mechanism carried by said box comes into operative relation with a manual crank which is mounted in the rear exterior housing wall, and which may at that time be operatively engaged with the dissolve mechanism.

Figure 8:
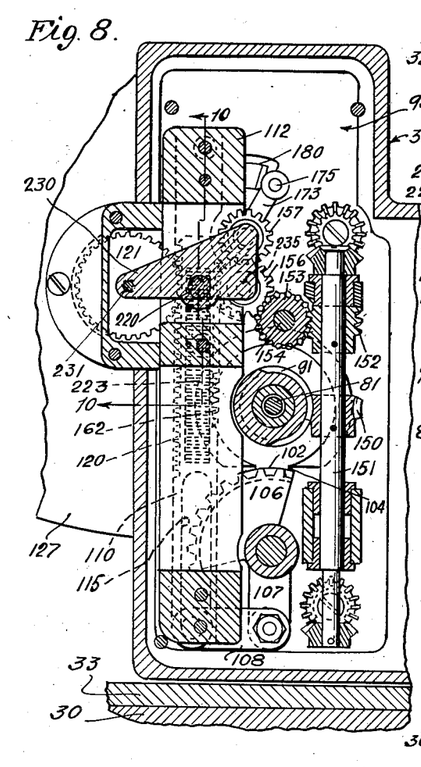
Fig. 8 is a section taken on line 8—8 of Fig. 7.

The dissolve mechanism also involves automatic devices for accomplishing the dissolve, which have engaging faces presented toward and registering with control or actuating devices mounted in the rear camera case wall 13 when the camera box has been moved to the "take" position illustrated in Fig. 12. The worm 91 on gear sleeve 90 meshes with worm gear 150 on a vertical shaft 151 (Figs. 7 and 8). Shaft 151 carries a spiral gear 152 which meshes with a spiral gear 153 on a stud shaft 154, said shaft 154 also carrying a spur gear 155. Gear 155 meshes with a spur gear 156, which in turn meshes with another spur gear 157 directly over it.

Gear 156 is mounted to rotate on the inner end of a shaft 160 which is mounted to reciprocate through a bore 161 in casting 93 (Figs. 12 and 13). Movement of shaft 160 inwardly from the position shown in Figs. 12 and 13 engages gear 156 with gear teeth 162 on the edge of vertically movable rack 110 which is opposite to the previously mentioned rack teeth 120. Gears 155, 156 and 157 are of sufficient length relative to each other that gear 156 remains in mesh with the other two gears during such movement into mesh with the rack. It will be evident that when gear 156 is thus in mesh with rack gear teeth 162, the rack will be moved in a vertical direction, and will actuate the shutter dissolve mechanism in a manner similar to that effected when hand crank 140 is operated, as previously described. The rack is then being moved by power applied through the gear train from the rotating shutter shaft 72. The upper gear 157 is mounted on a shaft 170 (Fig. 7) which is longitudinally movable in a bore in casting 93, gear 157 having a peripheral groove 172 engaged by a fork 173 mounted on the inner end of control shaft 175 which is mounted for longitudinal reciprocation through a bore 176 in casting 93. Inward movement of shaft 175 from the position shown in Fig. 7 causes gear 157 to move inwardly into engagement with the rack teeth 162 of rack 110, while remaining in mesh with its driving gear 156, and since gears 156 and 157 rotate in opposite directions, the rack is then moved in a direction opposite to that effected during the engagement of gear 156 with the rack, thus causing automatic operation of the dissolve mechanism in a sense opposite to that effected by engagement of gear 156 with the rack.

Figure 9:
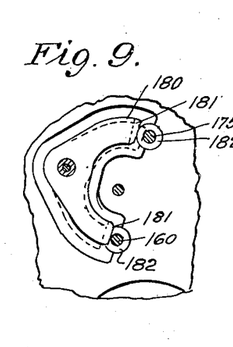
Fig. 9 is a section taken on line 9—9 of Fig. 7.
Figure 10:
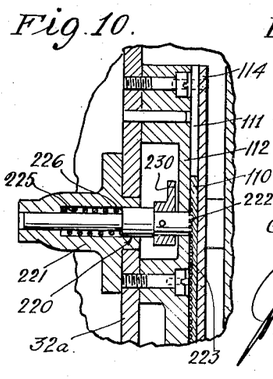
Fig. 10 is a section taken on line 10—10 of Fig. 8.
Figure 11:
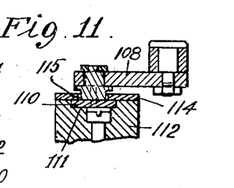
Fig. 11 is a section taken on line 11—11 of Fig. 7.

To prevent the gears 156 and 157 from being engaged simultaneously with the rack, there is provided a safety guard in the form of a pivoted yoke 180 (Figs. 9 and 13), the two arms of which have beveled ends 181 which engage conical surfaces 182 on shafts 160 and 175. The relative arrangement of the parts is such that in order for either of the two shafts to move inwardly to engage its gear with the rack, its conical surface 182 in engagement with the beveled end of the corresponding yoke arm must cause the yoke to swing to a position with the beveled end of its other arm moved into locking engagement with the inwardly inclined conical surface 182 of the other shaft. Thus but one of the two shafts can be moved inwardly at a time, inward movement of either one of the shafts positively locking the other against similar movement.

It has been said that gears 156 and 157 are moved into mesh with rack 110 by virtue of inward movement of shafts 160 and 175, respectively. These shafts are normally yieldingly held in a rearwardly retracted position by means of coil springs 185 and 186, respectively, (Figs. 7 and 13) placed around the shafts in counterbores 187 and 188, and acting outwardly on the shaft collars 189 and 190 which work within said counterbores.

The outer ends of shafts 160 and 175 are adapted to be actuated by actuating plungers 192 and 193, respectively, (Figs. 13 and 14) which are mounted to reciprocate through bores 194 and 195 in rear housing wall 13, and are located in said wall in such position that plungers 192 and 193 come into end to end register with shafts 160 and 175, respectively, when the camera box 32 is moved to photographing position (Fig. 12). The inner ends of plungers 192 and 193 have enlarged heads 196 and 197, respectively, adapted to engage the adjacent ends of shafts 160 and 175, said heads being engageable against the inner surfaces of rear wall casting 13 to limit outward movement of the plungers. The plungers are normally yieldingly held in a position with heads 196 and 197 in such engagement with wall 13 (clearing the outer ends of shafts 160 and 175) by means of coil springs 200 and 201 respectively, placed around said plungers in counterbores 202 and 203, and acting outwardly against shaft collars 204 and 205 which work within said counterbores.

On the outwardly projecting ends of plungers 192 and 193 are push buttons 206 and 207, respectively. It will be evident that normally there is no interference between shafts 160 and 175, and their actuating plungers 192 and 193, so that the camera box 32 is free of interference in its transverse shift; but that, when camera box 32 is in photographing position (Fig. 12), either of the plungers, say 192, may be moved inwardly by pressure of the finger on push button 206, until the inner end of said plunger engages the outer end of its corresponding shaft 160 and moves the latter inwardly to engage gear 155 with rack 110, with the previously described resulting operation of the dissolve mechanism. Upon release of push button 206, both members 160 and 192 return to their normal extended inoperative position. Shaft 175 is similarly operated to engage gear 157 with the rack by pushing inwardly on push button 207.

The means for locking the dissolve mechanism in such a way that relative rotation between the two shutter shafts cannot take place during normal operation of the camera will now be described in detail. For this purpose there is provided a locking plunger 220 (see Figs. 8, 10, 12 and 13) which is mounted to reciprocate in a bearing 221, the latter extending through and being fastened to camera wall 32a in such disposition that the end of plunger 220 is immediately opposite the rear side of rack member 110. The forward end of plunger 220 is provided with horizontally cut teeth 222 (Fig. 10), which are adapted to engage similar horizontal teeth 223 (see also Fig. 8) cut in a vertical row on the adjacent side of said rack. A coil spring 225 placed around plunger 220 and engaging a plunger shoulder 226 urges said plunger to move in a direction to engage its teeth 222 with rack teeth 223. It will be evident that this engagemnt, which may be made at any position of rack 10, positively locks the rack against vertical movement, and hence locks the entire dissolve mechanism adjustment means against operation. It will be evident, however, that this locking means does not lock the shutter mechanism against operation, since the shutter shafts are left free to rotate, and sleeve 100 is free to rotate with said shaft; the mechanism is locked, however, against longitudinal movement of sleeve 100 on gear sleeve 90, which is the action that causes relative rotation of inner shutter shaft 81 with reference to hollow shutter shaft 72.

When the dissolve mechanism is to be operated for the purpose of changing the shutter opening plunger 220 is withdrawn against spring 225 to disengage the rack for vertical movement. Plunger 220 carries for this purpose a plate 230, into one end of which is screwthreaded a push rod 231 which is reciprocable through the aforementioned hollow shaft 122 and projects normally a short distance beyond the shaft head 123 (Fig. 12). When crank 140 is moved inwardly to engage crank pin 133 with aperture 124 for the purpose of accomplishing a manual dissolve, crank disk 132 engages the projecting end of push rod 231 and forces it inwardly, thereby moving plate 230 and locking plunger 220 to disengage said plunger with rack 190. This disengaged position is shown in Fig. 13. The rack is thus freed for vertical movement, and manual crank 140 may be turned to accomplish the dissolve mechanism desired. When crank 140 is released, it moves outwardly under the influence of its spring 136, and so releases push rod 231 and plate 230 to move outwardly under the influence of locking plunger spring 225, which thereupon acts to move the locking plunger into engagement with the rack teeth to lock the dissolve mechanism against further shutter adjustment movement.

Locking plunger 230 is also moved inwardly to release the rack with inward movement of either shaft 160 or shaft 175 in meshing gears 156 or 157, respectively, with the rack. For this purpose shaft 160 has on its extreme inner end an extension 235 (Fig. 13) adapted to engage plate 230 during its inward movement to move said plate and locking plunger 220 inwardly to disengage the rack for vertical movement. For the same purpose, gear 157 which is moved inwardly into mesh with the rack through inward movement of shaft 176 is provided with a projection 236 (Fig. 7) adapted to engage and move plate 230 during such inward movement, and so cause disengagement of the locking plunger with the rack, thereby freeing the latter for vertical movement.

Reference is here made to my copending application entitled Shutter dissolve mechanism, Ser. No. 724,193, filed May 5, 1934, in which the automatic locking means for the shutter dissolve mechanism is claimed.

I claim:

1. In a motion picture camera, the combination of a closed exterior case, a camera mechanism mounted within the case and laterally shiftable therein from one position to another, shutter members and a manually controllable shutter dissolve mechanism on said laterally shifting camera mechanism, an actuating member for said dissolve mechanism having a portion presented rearwardly from the laterally shifting camera mechanism, and manual means for engaging and moving said actuating member embodying a member reciprocable in the rear wall of the exterior case and adapted to be moved to effect engagement with and movement of said rearwardly presented actuating member when the shiftable camera mechanism is in one of its said positions, said manual means being movable to a position in which the camera mechanism is cleared for its lateral shifting movement.

2. In a motion picture camera, the combination of a closed exterior case, a camera mechanism mounted within the case and laterally shiftable therein from one position to another, shutter members and a manually controllable shutter dissolve mechanism on said laterally shifting camera mechanism, a rotatable operating shaft for said dissolve mechanism extending rearwardly from the rear end of the camera mechanism on a line at right angles to the direction of lateral shift of said camera mechanism, a rotatable drive shaft longitudinally movable through the rear wall of the exterior case and so located as to be alined and register with said rearwardly extending operating shaft in one position of the shiftable camera mechanism, the adjacent ends of said registerable shafts being adapted for rotatable driving engagement with one another, and manual means for moving the rotatable drive shaft inwardly through the wall of the exterior case to drivingly engage and rotate the dissolve mechanism operating shaft.

3. In a motion picture camera, the combination of a closed exterior case, a camera mechanism mounted within the case and laterally shiftable therein from one position to another, shutter members and a controllable shutter dissolve mechanism on said laterally shifting camera mechanism, an axially reciprocable actuating shaft for said dissolve mechanism extending rearwardly from the rear end of the camera mechanism on a line at right angles to the direction of lateral shift of said camera mechanism, and an operating device on the rear wall of the exterior case and so located as to register with said rearwardly extending actuating shaft in one position of the camera mechanism, said operating device adapted to be manually operated to engage and operate said reciprocable actuating shaft when the camera mechanism is in said one position.

4. In a motion picture camera, the combination of a closed exterior case, a camera mechanism mounted within the case and laterally shiftable therein from one position to another, shutter members and a controllable shutter dissolve mechanism on said laterally shifting camera mechanism, an axially reciprocable actuating shaft for said dissolve mechanism extending rearwardly from the rear end of the camera mechanism on a line at right angles to the direction of lateral shift of said camera mechanism, and an operating plunger reciprocable through the rear wall of the exterior case and so located as to be alined and register with said rearwardly extending actuating shaft in one position of the camera mechanism, said plunger adapted to be manually moved inwardly to engage and operate said reciprocable actuating shaft when the camera mechanism is in said one position.

5. In a motion picture camera, the combination of a closed exterior case, an interior camera structure positioned within said case embodying a stationary frame and a mechanism carrier member transversely shiftable on said frame, shutter members and a manually controllable shutter dissolve mechanism on said transversely shiftable carrier member, an operating shaft for said mechanism extending rearwardly from the rear end of the carrier member on a line at right angles to the direction of transverse shift of said member, and manual shaft operating means mounted for reciprocation in the rear wall of the exterior case and movable on a line coincident with said operating shaft when the transversely shiftable carrier is in a given position with reference to the camera frame to drivingly engage and operate said shaft.

6. In a motion picture camera, the combination of a closed exterior case, an interior camera structure positioned within said case embodying a stationary frame and a mechanism carrier member transversely shiftable on said frame, shutter members and a manually controllable shutter dissolve mechanism on said transversely shiftable carrier member, a rotatable operating shaft for said mechanism extending rearwardly from the rear end of the carrier member on a line at right angles to the direction of transverse shift of said member, a rotatable drive shaft longitudinally movable through the rear wall of the exterior case and so located as to be alined and register with said rearwardly extending operating shaft in one position of the carrier member, the adjacent ends of said registerable shafts being adapted for rotatable driving engagement with one another, and manual means for moving the rotatable drive shaft inwardly through the wall of the exterior case to drivingly engage and rotate the dissolve mechanism operating shaft.

7. In a motion picture camera, the combination of a closed exterior case, an interior camera structure positioned within said case embodying a stationary frame and a mechanism carrier member transversely shiftable on said frame, shutter members and a manually controllable shutter dissolve mechanism on said transversely shiftable carrier member, a rotatable operating shaft for said mechanism extending rearwardly from the rear end of the carrier member on a line at right angles to the direction of transverse shift of said member, a rotatable drive shaft longitudinally movable through the rear wall of the exterior case and so located as to be alined and register with said rearwardly extending operating shaft in one position of the carrier member with reference to the frame, the adjacent ends of said registerable shafts being adapted for rotatable driving engagement with one another, manual means for moving the rotatable drive shaft inwardly through the wall of the exterior case to drivingly engage and rotate the dissolve mechanism operating shaft, and spring means yieldingly urging said drive shaft to a position out of engagement with said dissolve mechanism operating shaft to clear said carrier member for its transverse shifting movement.

8. In a motion picture camera, the combination of a closed exterior case, an interior camera structure positioned within said case embodying a stationary frame and a mechanism carrier member transversely shiftable on said frame, shutter members and a controllable shutter dissolve mechanism on said transversely shiftable carrier member, an axially reciprocable actuating shaft for said mechanism extending rearwardly from the rear end of the carrier member on a line at right angles to the direction of transverse shift of said member, and an operating device on the rear wall of the exterior case and so located as to register with said rearwardly extending actuating shaft in one position of the carrier member with reference to the frame, said operating device adapted to be manually operated to engage and operate said reciprocating control shaft when the carrier member is in said one position.

9. In a motion picture camera, the combination of a closed exterior case, an interior camera structure positioned within said case embodying a stationary frame and a mechanism carrier member transversely shiftable on said frame, shutter members and a controllable shutter dissolve mechanism on said transversely shiftable carrier member, an axially reciprocable control shaft for said mechanism extending rearwardly from the rear end of the carrier member on a line at right angles to the direction of lateral shift of said member, and an operating plunger reciprocable through the rear wall of the exterior case and so located as to be alined and register with said rearwardly extending actuating shaft in one position of the carrier member with reference to said frame, said plunger adapted to be manually moved inwardly to engage and operate said reciprocable control shaft when the carrier member is in said one position, and thereafter to retract to clear said member for its transverse shifting movement.

10. In a motion picture camera, the combination of a closed exterior case, a camera mechanism mounted within the case and laterally shiftable therein from one position to another, shutter members and a manually controllable shutter dissolve mechanism on said laterally shiftable camera mechanism, an operating shaft for said dissolve mechanism extending rearwardly from the rear end of the camera mechanism on a line at right angles to the direction of lateral shift of said member, manual shaft operating means mounted in the rear wall of the exterior case and movable to drivingly engage and operate said shaft when the shiftable camera mechanism is in one of its positions, and a spring normally holding said shaft operating means yieldingly in a disengaged position in which the camera mechanism is cleared for its lateral shifting movement.

11. In a motion picture camera, the combination of a closed exterior case, a camera mechanism mounted within the case and laterally shiftable therein from one position to another, shutter members and a manually controllable shutter dissolve mechanism on said laterally shiftable camera mechanism, a rotatable operating shaft for said dissolve mechanism extending rearwardly from the rear end of the camera mechanism on a line at right angles to the direction of lateral shift of said mechanism, a rotatable drive shaft longitudinally movable through the rear wall of the exterior case and so located as to be alined and register with said rearwardly extending operating shaft in one position of the shiftable camera mechanism, the adjacent ends of said registerable shafts being adapted for rotatable driving engagement with one another, manual means for moving the rotatable drive shaft inwardly through the wall of the exterior case to drivingly engage and rotate the dissolve mechanism operating shaft, and a spring normally holding said rotatable drive shaft yieldingly in an outward retracted position disengaged from said rotatable dissolve mechanism shaft and in which the camera mechanism is cleared for its lateral shifting movement.

12. In a motion picture camera, the combination of a closed exterior case, a camera mechanism mounted within the case and laterally shiftable therein from one position to another, shutter members and a controllable shutter dissolve mechanism on said laterally shiftable camera mechanism, a reciprocable actuating member for said dissolve mechanism having an engaging surface facing rearwardly from the rear end of the camera mechanism and movable in a direction substantially at right angles to the direction of lateral shift of said mechanism, an operating plunger reciprocable through the rear wall of the exterior case and so located as to register with said rearwardly extending actuating member in one position of the camera mechanism, said plunger adapted to be manually moved inwardly to engage and operate said reciprocable actuating member when the camera mechanism is in said one position, and a spring normally holding said plunger in an outward retracted position disengaged from said reciprocable actuating member and in which the camera mechanism is cleared for its lateral shifting movement.

13. In a motion picture camera, the combination of a closed exterior case, an interior camera structure positioned within said case embodying a stationary frame and a mechanism carrier member transversely shiftable on said frame, shutter members and a controllable shutter dissolve mechanism on said transversely shiftable carrier member, an axially reciprocable actuating shaft for said mechanism extending rearwardly from the rear end of the carrier member on a line at right angles to the direction of lateral shift of said member, an operating plunger reciprocable through the rear wall of the exterior case and so located as to be alined and register with said rearwardly extending actuating shaft in one position of the carrier member with reference to said frame, said plunger adapted to be manually moved inwardly to engage and operate said reciprocable actuating shaft when the carrier member is in said one position, and a spring normally holding said plunger in an outward retracted position disengaged from said reciprocable actuating shaft and in which the mechanism carrier member is cleared for its lateral shifting movement.

GEORGE A. MITCHELL.